United States Patent
Yang et al.

(10) Patent No.: US 9,141,885 B2
(45) Date of Patent: Sep. 22, 2015

(54) VISUAL PATTERN RECOGNITION IN AN IMAGE

(71) Applicant: Adobe Systems Incorporated, San Jose, CA (US)

(72) Inventors: Jianchao Yang, San Jose, CA (US); Guang Chen, Columbia, MO (US); Jonathan Brandt, Santa Cruz, CA (US); Hailin Jin, San Jose, CA (US); Elya Shechtman, Seattle, WA (US); Aseem Omprakash Agarwala, Seattle, WA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 231 days.

(21) Appl. No.: 13/953,394

(22) Filed: Jul. 29, 2013

(65) Prior Publication Data

US 2015/0030238 A1    Jan. 29, 2015

(51) Int. Cl.
*G06K 9/00* (2006.01)
*G06K 9/62* (2006.01)

(52) U.S. Cl.
CPC .................................... *G06K 9/627* (2013.01)

(58) Field of Classification Search
None
See application file for complete search history.

(56) References Cited

U.S. PATENT DOCUMENTS

| | | | | |
|---|---|---|---|---|
| 4,670,851 | A * | 6/1987 | Murakami et al. | 378/121 |
| 4,963,030 | A * | 10/1990 | Makur | 375/240.22 |
| 5,274,714 | A * | 12/1993 | Hutcheson et al. | 382/157 |
| 5,300,931 | A * | 4/1994 | Lindsay et al. | 341/106 |
| 5,325,445 | A * | 6/1994 | Herbert | 382/225 |
| 5,398,069 | A * | 3/1995 | Huang et al. | 375/240.22 |
| 5,506,801 | A * | 4/1996 | Tawel | 708/801 |
| 5,517,666 | A * | 5/1996 | Ohtani et al. | 712/3 |
| 5,692,012 | A * | 11/1997 | Virtamo et al. | 375/240 |
| 5,821,986 | A * | 10/1998 | Yuan et al. | 348/14.12 |
| 6,038,337 | A * | 3/2000 | Lawrence et al. | 382/156 |
| 6,154,572 | A * | 11/2000 | Chaddha | 382/253 |
| 6,404,923 | B1 * | 6/2002 | Chaddha | 382/224 |
| 6,795,804 | B1 * | 9/2004 | Goel et al. | 704/203 |
| 8,224,042 | B2 * | 7/2012 | Wang | 382/118 |
| 8,503,792 | B2 * | 8/2013 | Zhang et al. | 382/195 |
| 8,705,866 | B2 * | 4/2014 | Zhang et al. | 382/195 |
| 8,731,317 | B2 * | 5/2014 | Sanchez et al. | 382/253 |
| 8,773,535 | B2 * | 7/2014 | Zhang | 348/149 |
| 2004/0170325 | A1 * | 9/2004 | Eichhorn et al. | 382/205 |

(Continued)

OTHER PUBLICATIONS

Jegou, Herve, et al., "Aggregating Local Descriptors into a Compact Image Representation", (2010), 9 pgs.

*Primary Examiner* — Aaron W Carter
(74) *Attorney, Agent, or Firm* — Shook, Hardy & Bacon L.L.P.

(57) ABSTRACT

A system may be configured as an image recognition machine that utilizes an image feature representation called local feature embedding (LFE). LFE enables generation of a feature vector that captures salient visual properties of an image to address both the fine-grained aspects and the coarse-grained aspects of recognizing a visual pattern depicted in the image. Configured to utilize image feature vectors with LFE, the system may implement a nearest class mean (NCM) classifier, as well as a scalable recognition algorithm with metric learning and max margin template selection. Accordingly, the system may be updated to accommodate new classes with very little added computational cost. This may have the effect of enabling the system to readily handle open-ended image classification problems.

20 Claims, 9 Drawing Sheets

(56) References Cited

U.S. PATENT DOCUMENTS

| | | | |
|---|---|---|---|
| 2006/0103665 A1* | 5/2006 | Opala et al. | 345/619 |
| 2006/0140455 A1* | 6/2006 | Costache et al. | 382/118 |
| 2007/0018994 A1* | 1/2007 | Sekine | 345/582 |
| 2007/0229506 A1* | 10/2007 | Sugita et al. | 345/441 |
| 2008/0212887 A1* | 9/2008 | Gori et al. | 382/248 |
| 2009/0148059 A1* | 6/2009 | Matsuda | 382/251 |
| 2010/0124377 A1* | 5/2010 | Yu et al. | 382/224 |
| 2010/0202707 A1* | 8/2010 | Costache et al. | 382/224 |
| 2010/0329548 A1* | 12/2010 | Yoshimura | 382/164 |
| 2011/0229045 A1* | 9/2011 | Yu | 382/224 |
| 2012/0213419 A1* | 8/2012 | Kim et al. | 382/118 |
| 2015/0030238 A1* | 1/2015 | Yang et al. | 382/159 |
| 2015/0063713 A1* | 3/2015 | Yang et al. | 382/225 |

* cited by examiner

VISUAL PATTERN RECOGNITION IN AN IMAGE

TECHNICAL FIELD

The subject matter disclosed herein generally relates to the processing of data. Specifically, the present disclosure addresses systems and methods of facilitating visual pattern recognition.

BACKGROUND

A visual pattern may be depicted in an image. An example of a visual pattern is text, such as dark words against the white background or vice versa. Moreover, text may be rendered in a particular typeface or font (e.g., Times New Roman) and in a particular style (e.g., regular, semi-bold, bold, black, italic, or any suitable combination thereof). Another example of a visual pattern that may be depicted in an image is an object, such as a car, a building, or a flower. A further example of a visual pattern is a face (e.g., a face of a human or animal). A face depicted in an image may be recognizable as a particular individual. Furthermore, the face within an image may have a particular facial expression, indicate a particular gender, indicate a particular age, or any suitable combination thereof. Another example of a visual pattern is a scene (e.g., a landscape or a sunset). A visual pattern may exhibit coarse-grained features (e.g., an overall shape of alphabetic letter rendered in a font), fine-grained features (e.g., a detailed shape of an ending of the letter that is rendered in the font), or any suitable combination thereof.

BRIEF DESCRIPTION OF THE DRAWINGS

Some embodiments are illustrated by way of example and not limitation in the figures of the accompanying drawings.

DETAILED DESCRIPTION

Figure 1:
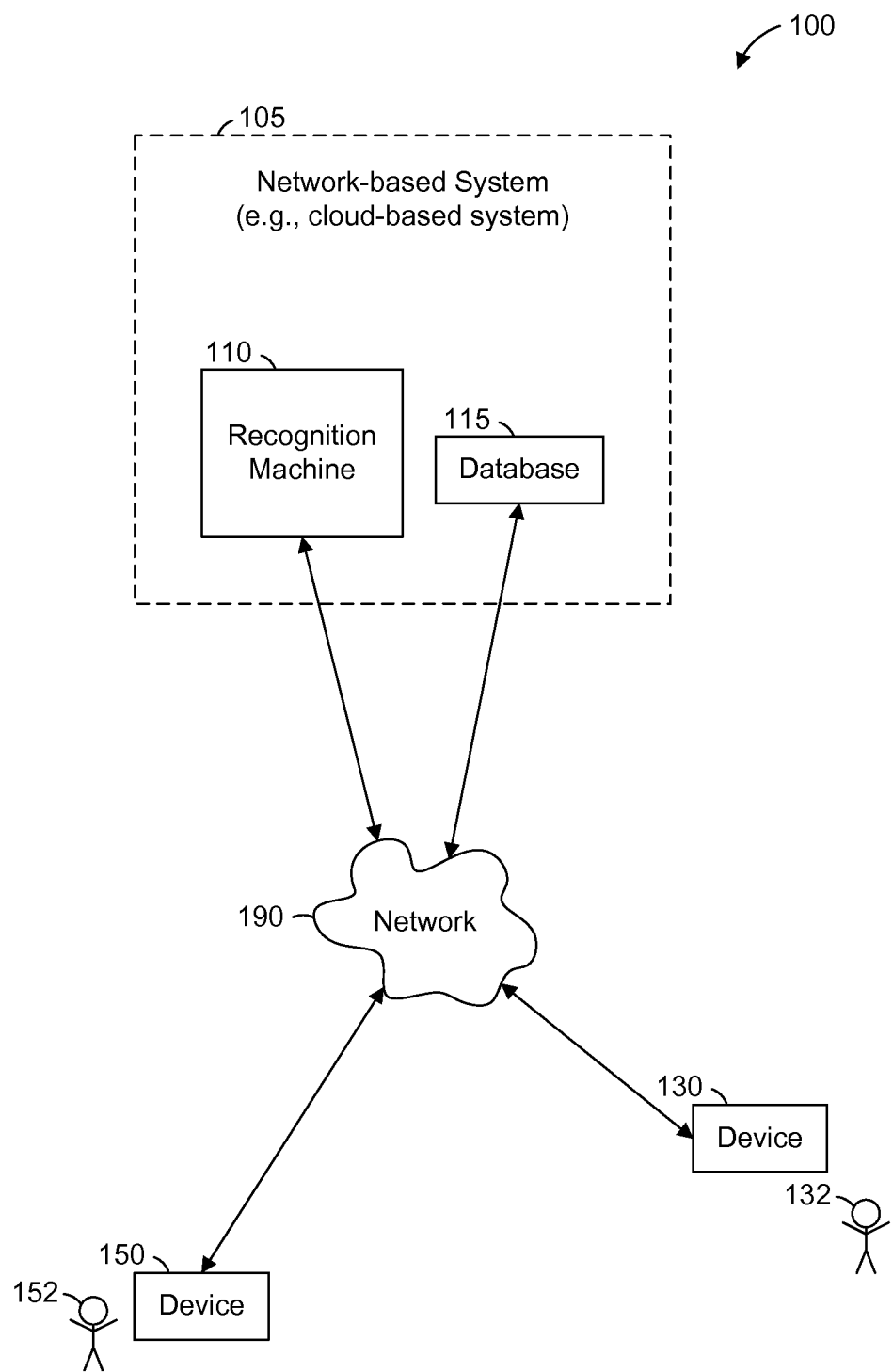
FIG. 1 is a network diagram illustrating a network environment suitable for visual pattern recognition, according to some example embodiments.

Example methods and systems are directed to visual pattern recognition in an image (e.g., classification, categorization, or identification of a visual pattern within an image). Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details. For example, visual pattern recognition in the example form of font recognition (e.g., classifying, categorizing, or identifying a typeface or font used for rendering text in an image) is discussed herein, and other example forms of visual pattern recognition may be supported, such as facial analysis (e.g., face recognition, expression recognition, gender recognition, age estimation, or any suitable combination thereof), object recognition, and scene categorization.

An image classification machine (e.g., configured by one or more software modules) may classify a generic image by implementing a pipeline of first encoding local image descriptors (e.g., scale-invariant feature transform (SIFT) descriptors, local binary pattern (LBP) descriptors, kernel descriptors, or any suitable combination thereof) into sparse codes, and then pooling the sparse codes into a fixed-length image feature representation. With each image represented as a collection of local image descriptors $\{x_i\}_{i=1}^n$ with $x_i \in \Re^d$, the first coding step encodes each local descriptor into some code (e.g., a sparse code), $$y_i = f(x_i, T), \quad (1)$$

where $T=[t_1; t_2, \ldots, t_K]$ denotes a template model or codebook of size $K$ and $x_i \in \Re^d$, f is the encoding function (e.g., vector quantization, soft assignment, locality-constrained linear coding (LLC), or sparse coding), and $y_i \in \Re^K$ is the code for $x_i$. Then the pooling step obtains the final image representation by $$z = g(\{y_i\}_{i=1}^n), \quad (2)$$

where g is a pooling function that computes some statistics from each dimension of the set of vectors $\{y_i\}_{i=1}^n$ (e.g., average pooling or max pooling), and $z \in \Re^K$ is the pooled feature vector that may later be fed into a classifier.

While the above feature extraction pipeline may be effective at distinguishing different categories of objects, it may be insufficient to capture the subtle differences within an object category for fine-grained recognition (e.g., letter endings or other fine details that characterize various typefaces and fonts for text). According to example embodiments of the systems and methods described herein, the above feature extraction pipeline may be extended by embedding local features into the pooling vector to preserve the fine-grained details (e.g., details of local letter parts in text). Specifically, using max pooling in Eqn. (2), such systems and methods not only pool the maximum sparse coefficients, but also record the indices of these max pooling coefficients:

$$\{z,e\} = \max(\{y_i\}_{i=1}^n), \quad (3)$$

where z contains the max coefficients pooled from each dimension of the set $\{y_i\}_{i=1}^n$ and e is its index vector. Denoting $e_k = e(k)$ and $z_k = z(k)$, it can be seen that $z_k = y_{e_k}(k)$. Instead of using the max pooling coefficients as the final image feature representation, the pooling coefficients may be obtained together with the local descriptor that fires each of them $\{z_k, x_{e_k}\}_{k=1}^K$. The final feature representation may be constructed by concatenating these local descriptors weighted by their pooling coefficients:

$$f = [z_1 x_{e_1}; z_2 x_{e_2}; \ldots ; z_K x_{e_K}]. \quad (4)$$

The max pooling procedure may introduce a competing process for all the local descriptors to match templates. Each pooling coefficient $z_k$ measures the response significance of $x_{e_k}$ with respect to template $t_k$, which is effective at categorizing coarse object shapes, while the pooled local descriptor $x_{e_k}$ preserves the local part details that are discriminative for classifying subtle fine-grained differences when the pooling coefficients are similar. Therefore, the feature representation in Equation (4) can capture both coarse level object appearance changes and subtle object part changes. This feature representation may be called local feature embedding (LFE).

Local feature embedding may embed the local descriptors from max pooling into a much higher dimensional space of $\Re^{Kd}$. For instance, if we use 59-dimensional LBP descriptors and a codebook size of 2048, the dimension off without using spatial pyramid matching (SPM) is already 120,832. Although embedding the image into higher dimensional spaces may be amicable to linear classifiers, training classifiers for very large-scale applications can be very time-consuming. Moreover, a potential drawback of training classifiers for large-scale classification is that, when images of new categories become available or when new images are added to existing categories, the retraining of new classifiers may involve a very high computational cost. Accordingly, the systems and methods described herein utilize a new large-scale classification algorithm based on local feature metric learning and template selection, which can be readily generalized to new classes and new data at very little computational cost. For this purpose, the LFE feature in Equation (4) may be modified into a local feature set representation:

$$f=\{(z_k, x_{e_k})\}_{k=1}^{K}. \tag{5}$$

In a large-scale visual font recognition task, the dataset may be open-ended. For example, new font categories may appear over time and new data samples could be added to the existing categories. It may be important for a practical classification algorithm to be able to generalize to new classes and new data at very little cost. Nearest class mean (NCM), together with metric learning, may be used for certain large-scale classification tasks in which each class is represented by a mean feature vector that is efficient to compute. The systems and methods described herein may use NCM based on pooled local features to form a set of weak classifiers. Furthermore, a max-margin template selection scheme may be implemented to combine these weak classifiers for the final classification, categorization, or identification of a visual pattern within an image.

Supposing that the LFE feature $f=\{(z_k, x_{e_k})\}_{k=1}^{K}$ for each image is known (e.g., given or predetermined), a recognition system may generate (e.g., determine or calculate) a Mahalanobis distance metric for each pooled local feature space, under which an NCM classifier may be formulated using multi-class logistic regression, where the probability for a class c given a pooled local feature $x_{e_k}$ is defined by $$p(c \mid x_{e_k}) = \frac{\exp(-\|\mu_k^c - x_{e_k}\|_{W_k}^2)}{\sum_{c'=1}^{C} \exp(-\|\mu_k^{c'} - x_{e_k}\|_{W_k}^2)}, \tag{6}$$

where $\mu_k^c$ is the class mean vector for the k-th pooled local features in class c, and $$\|\mu_k^c - x_{e_k}\|_{W_k}^2 = (\mu_k^c - x_{e_k})^T W_k^T W_k (\mu_k^c - x_{e_k}). \tag{7}$$

Denoting $\Sigma_k^{-1} = W_k^T W_k$, it can be seen that the k-th pooled feature space (or its projected subspace) may be modeled as a Gaussian distribution with an inverse covariance matrix $\Sigma_k^{-1}$.

A metric learning method called within-class covariance normalization (WCCN) may be used to learn the metric $W_k$ for the k-th pooled feature space. First, interpreting $z_k$ as the probabilistic response of $x_{e_k}$ to template $t_k$, the class mean vector $\mu_k^c$ may be computed as $$\mu_k^c = \frac{1}{Z^c} \sum_{i \in I_c} z_k^i x_{e_k}^i, \tag{8}$$

where i is the index for the i-th training image with LFE feature $f^i = \{z_k^i, x_{e_k}^i\}_{k=1}^{K}$, $I_c$ denotes the sample index set for class c, and $Z^c = \sum_{i \in I_c} z_k^i$ is a normalization factor. Then, the expected within-class covariance matrix over all classes may be computed as $\Sigma_k$:

$$\sum\nolimits_k = E[\sum\nolimits_{c'k}] \approx \sum_{c'=1}^{C} p(c') \sum\nolimits_k^{c'}, \tag{9}$$

where $$p(c') = \frac{\sum_{i \in I_c} z_k^i}{\sum_i z_k^i}, \tag{10}$$

is the empirical probability of class c', and $\Sigma_k^{c'}$ s the within-class covariance for class c' defined as $$\sum\nolimits_k^{c'} \approx \frac{1}{Z^{c'}} \sum_{i \in I_{c'}} z_k^i (x_{e_k}^i - \mu_k^{c'})(x_{e_k}^i - \mu_k^{c'})^T, \tag{11}$$

with $Z^{c'} = \sum_{i \in I_{c'}} z_k^i$. In practice, empirical estimates of $\Sigma_k$ may be noisy. Therefore, a certain amount of smoothness may be added by shrinking $\Sigma_k$ towards the scalar covariance as $$\hat{\Sigma}_k = (1-\alpha)\Sigma_k + \alpha \sigma_2 I, \alpha \in [0,1), \tag{12}$$

where $\hat{\Sigma}_k$ represents a smoothed version of the empirical expected within-class covariance matrix, I is the identity matrix, and $\sigma^2$ can take the value of trace $(\Sigma_k)$. An example system may therefore compute the eigen-decomposition for each $\hat{\Sigma}_k = U_k D_k U_k^T$, where $U_k$ is orthonormal and $D_k$ is a diagonal matrix of positive eigenvalues. Then the feature projection matrix $W_k$ in Equation (6) may be defined as $$W_k = D_k^{-1/2} U_k^T, \tag{13}$$

which basically spheres the data based on the common covariance matrix. In the transformed space, NCM may be used as the classifier, which may lay the foundation for the multi-class logistic regression in Equation (6).

To further enhance the discriminative power of $W_k$, the projection components with high within-class variability may be depressed, for example, by discarding the first few largest eigen-values in $D_k$, which corresponds to the subspace where the feature similarity and label similarity are most out of sync (e.g., with large eigenvalues corresponding to large within-class variance). In such a case, the solution of WCCN may be interpreted as the result of discriminative subspace learning.

After obtaining the metric for each pooled local feature space, and assuming the templates in T are independent, an example system may evaluate the posterior of a class c for the input image feature representation f by combining the outputs of Equation (6) using a log-linear model:

$$p(c \mid f) = \frac{1}{H} \exp\left(a + \sum_k w_k \log p(c \mid x_{e_k})\right) \quad (14)$$

where H is a normalization factor to ensure the integrity of p(c|f), $w_k$ weights the contribution of each pooled local feature to the final classification, and a is a small constant offset. Here, the weight vector $w=[w_1, w_2, \ldots, w_K]^T$, which may be shared by all classes, may act to select the most discriminative templates from the template model $T=\{t_K\}_{k=1}^K$ for the given classification task. Then, the classification task for f is simply to choose the class with the largest posterior:

$$c^* = \underset{c'}{\operatorname{argmax}}\, p(c' \mid f). \quad (15)$$

Alternatively, an example system may be configured to treat the multi-class logistic regression for each pooled local feature as a weak classifier, and then linearly combine them to obtain a strong classifier:

$$s(c \mid f) = \sum_{k=1}^K w_k p(c \mid x_{e_k}). \quad (16)$$

In this way, an example system may avoid the numerical instability and data scale problem of logarithm in Equation (14). The score function s(c|f) need not have a probabilistic interpretation any more, but the classification task may again be to find the class with the largest score output. In practice, this formulation may work slightly better than a log-linear model, and this linear model may be implemented in the example systems and methods discussed herein.

Given a set of training samples $\{f^i, c^i\}_{i=1}^N$, where $c^i \in \{1, \ldots, C\}$ is the class label for the i-th data sample, it is possible to find the optimal weight vector w such that the following constraints are best satisfied:

$$s(c^i \mid f^i) > s(c' \mid f^i), \forall i, c' \neq c^i, \quad (17)$$

which translates to:

$$\sum_{k=1}^K w_k \left(p(c^i \mid x_{e_k}^i) - p(c' \mid x_{e_k}^i)\right) > 0, \forall\, i,\, c^i \neq c^i. \quad (18)$$

In order to learn w, it may be helpful to define a cost function using a multi-class hinge loss function to penalize violations of the above constraints:

$$L(f^i, c^i; w) = \sum_{c' \neq c^i} \max\{0, -\gamma^i(c') + 1\}, \quad (19)$$

where $$\gamma^i(c') = \sum_{k=1}^K w_k \left(p(c^i \mid x_{e_k}^i) - p(c' \mid x_{e_k}^i)\right). \quad (20)$$

Then w may be obtained by solving the following optimization:

$$\min_w \lambda \sum_{i=1}^N L(f^i, c^i; w) + \rho(w), \quad (21)$$

where ρ(w) regularizes the model complexity. Note that when $\rho(w) = \|w\|_2^2$, Equation (21) is a classical one-class support vector machine (SVM) formulation. To see this, denoting $$p^i(c) = [p(c \mid x_{e_1}^i); p(c \mid x_{e_2}^i); \ldots; p(c \mid x_{e_K}^i)], \quad (22)$$

and $q^i(c') = p^i(c^i) - p^i(c')$, Equation (19) may translate to $$L(f^i, c^i; w) = \sum_{c' \neq c^i} \max\{0, -w^T q^i(c') \cdot 1 + 1\}, \quad (23)$$

where $q^i(c')$ may be regarded as feature vectors with only positive label +1. Therefore, the optimization in Equation (21) is the classical SVM formulation with only positive class and thus can be solved by an SVM package. The regularization term ρ(w) may also take the form of $\|w\|_1$, where the $l^1$-norm promotes sparsity for template selection, which may have better generalization behavior when the size K of the template model T is very large.

After the WCCN metric is obtained for all pooled local feature spaces and the template weights based on LFE, the classification task for a given f may be straightforward: first compute the local feature posteriors using Equation (6), combine them with the learned weights w, and then determine (e.g., predict, infer, or estimate) the class label by selecting the largest score output $c^* = \max_{c'} s(c' \mid f)$. When new data or font classes are added to the database, it is sufficient to calculate the new class mean vectors and estimate the within-class covariances to update the WCCN metric incrementally. Because the template model is universally shared by all classes, the template weights do not need to be retrained. Therefore, the above-described algorithm (e.g., as implemented in the example methods and systems described herein) can readily adapt to new data or new classes at little added computational cost.

FIG. 1 is a network diagram illustrating a network environment suitable for visual pattern recognition, according to some example embodiments. The network environment 100 includes a recognition machine 110, a database 115, and devices 130 and 150, all communicatively coupled to each other via a network 190. The recognition machine 110, the database, 115, and the devices 130 and 150 may each be implemented in a computer system, in whole or in part, as described below with respect to FIG. 9.

Figure 2:
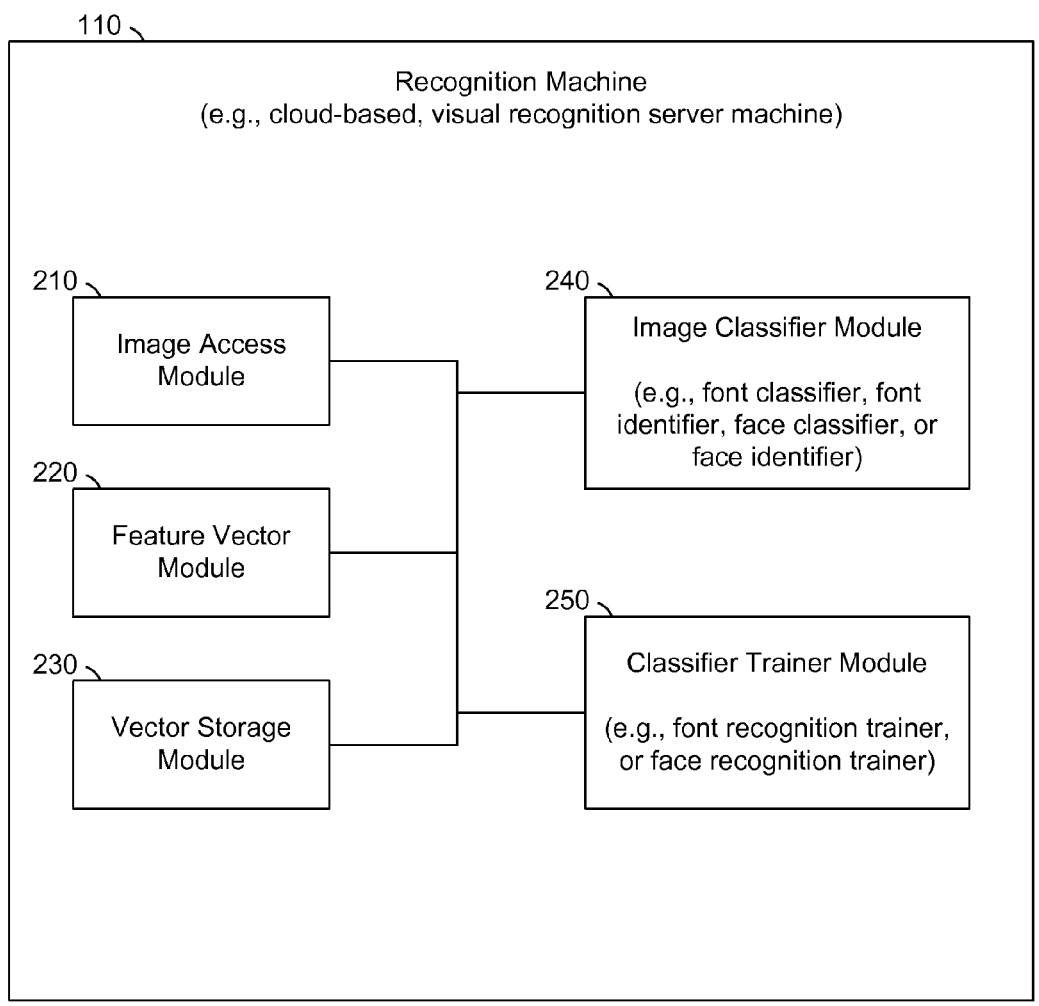
FIG. 2 is a block diagram illustrating components of a recognition machine suitable for recognizing a visual pattern in an image, according to some example embodiments.

The recognition machine 110 may be configured (e.g., by one or more software modules, as described below with respect to FIG. 2) to perform one or more of any of the methodologies discussed herein, in whole or in part. Such methodologies including image processing algorithms that may be used by the recognition machine 110 to train an image classifier, use an image classifier to classify (e.g., recognize, categorized, or identify) an image, or both. The database 115 may store one or more images before, during, or after image processing by the recognition machine 110. Accordingly, the database 115 may store a trainer set of images (e.g., a training database of images for training an image classifier), a set of unclassified images (e.g., a test database of test images, or a production database of captured images) to be processed by the recognition machine 110, or any suitable combination thereof. Moreover, the recognition machine 110, with or without the database 115 may form all or part of a network-based system 105. The network-based system 105 may be or include a cloud-based image processing system (e.g., visual pattern recognition system) that provides one or more network-based image processing services (e.g., a visual pattern recognition service). For example, an image may be received by the recognition machine 110 from the device 130, and the recognition machine 110 may perform image processing operations on the image to classify the image according to one or more visual patterns recognized within the image.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the recognition machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof FIG. 2 is a block diagram illustrating components of the recognition machine 110, according to some example embodiments. The recognition machine 110 may be a cloud-based visual recognition server machine and is shown as including an image access module 210, a feature vector module 220, and a vector storage module 230, all configured to communicate with each other (e.g., via a bus, shared memory, or a switch).

As shown, the recognition machine 110 may include an image classifier module 240, a classifier trainer module 250, or both. The image classifier module 240 may be or include a font classifier (e.g., typeface classifier), a font identifier (e.g., typeface identifier), a face classifier (e.g., facial expression classifier, facial gender classifier, or both), face identifier (e.g., face recognizer), or any suitable combination thereof. The classifier trainer module 250 may be or include a font recognition trainer (e.g., typeface recognition trainer), a face recognition trainer, or any suitable combination thereof. As shown in FIG. 2, the image classifier module 240 and the classifier trainer module 50 may be configured to communicate with each other, as well as with the image access module 210, the feature vector module 220, and a vector storage module 230.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
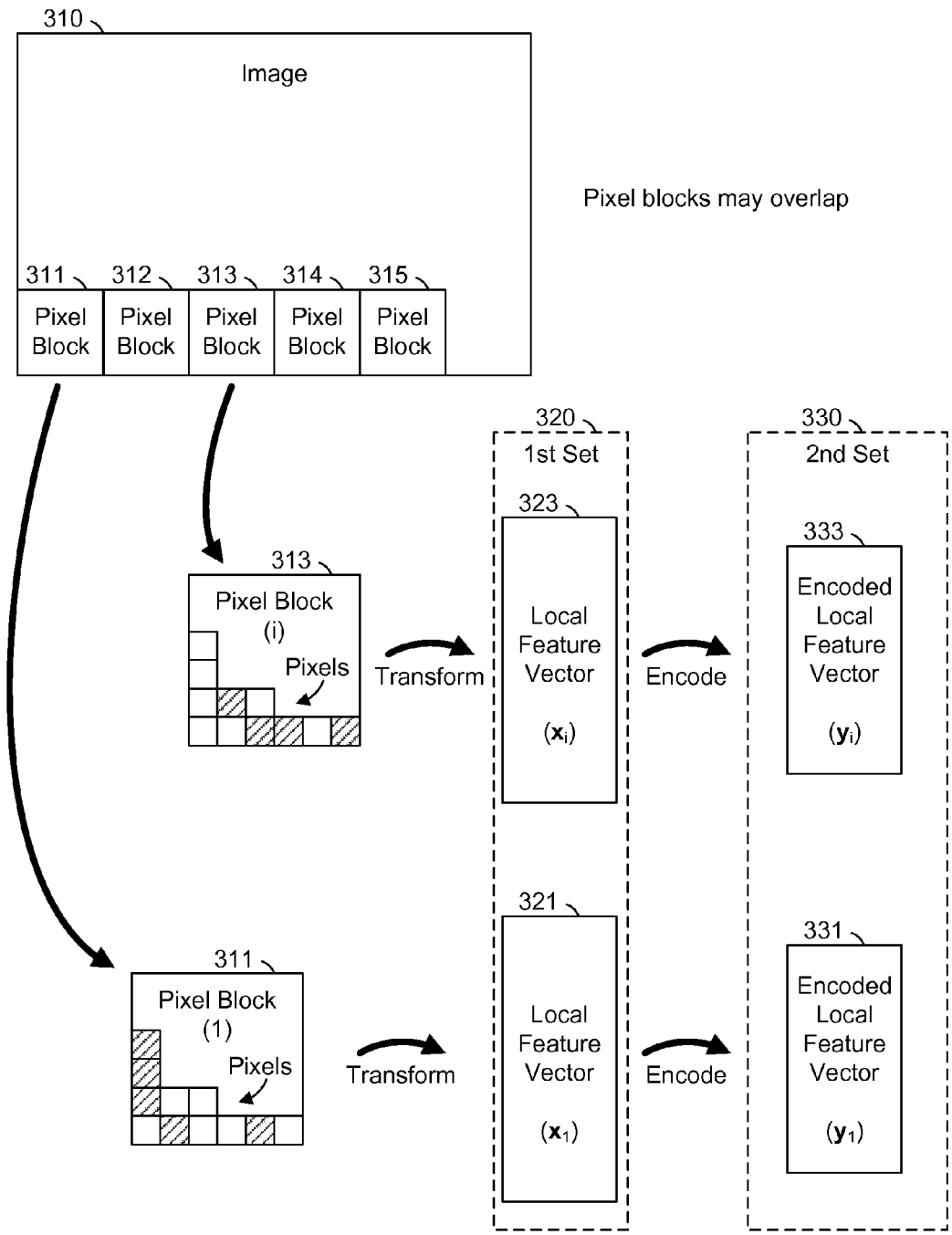
FIG. 3 is a conceptual diagram that illustrates generation and encoding of local feature vectors from pixel blocks of the image, according to some example embodiments.

FIG. 3 is a conceptual diagram that illustrates generation and encoding of local feature vectors (e.g., local feature vectors 321 and 323) from pixel blocks (e.g., pixel blocks 311 and 313) of an image 310, according to some example embodiments. The image 310 (e.g., a digital picture or photo) may depict a visual pattern (e.g., text rendered in a font, an object, a face, a scene, or any suitable combination thereof). The image 310 may be stored in the database 115 and accessed by the image access module 210 of the recognition machine 110.

As shown in FIG. 3, the image 310 may be divided (e.g., by the feature vector module 220 of the recognition machine 110) into blocks of pixels (e.g., pixel blocks 311, 312, 313, 314, and 315). In some example embodiments, the pixel blocks overlap each other. That is, neighboring (e.g., adjacent) pixel blocks may overlap by one or more pixels (e.g., 10 pixels). The pixel block 311 may be a first pixel block (e.g., having an index of 1 or indexed as 1) of the image 310, and the pixel block 313 may be an i-th pixel block (e.g., having an index of i) of the image 310.

FIG. 3 illustrates the pixel block 313 (e.g., the i-th pixel block) undergoing a mathematical transformation to generate a corresponding local feature vector 323 (e.g., an i-th local feature vector, labeled "$x_i$"). This mathematical transformation may be performed by the feature vector module 220. Similarly, the pixel block 311 (e.g., the first pixel block) may be mathematically transformed to generate its corresponding local feature vector 321 (e.g., a first local feature vector, labeled "$x_1$"). This process may be repeated for all pixel blocks in the image 310 (e.g., pixel blocks 312, 314, and 315, as well as other pixel blocks in the image 310). Accordingly, these generated local feature vectors (e.g., local feature vectors 321 and 323) may constitute a first set 320 of vectors (e.g., local feature vectors) for the image 310.

According to some example embodiments, the first set 320 of vectors may each have a same number of dimensions, which may be called a first number of dimensions. For example, the first set 320 of vectors may each have 10 dimensions as a result of the mathematical transformation being applied to each of the pixel blocks (e.g., pixel blocks 311-315) of the image 310.

FIG. 3 further illustrates the first set 320 of vectors being encoded (e.g., by the feature vector module 220) to generate a second set 330 of vectors (e.g., encoded local feature vectors) for the image 310. As shown, the second set 330 of vectors includes an encoded local feature vector 333 (e.g., an i-th encoded local feature vector, labeled "$y_i$") that corresponds to the local feature vector 323 (e.g., the i-th local feature vector). That is, the encoded local feature vector 333 may be an encoded representation of the local feature vector 323. Similarly, the second set 330 of vectors includes encoded local feature vector 331 (e.g., a first encoded local feature vector, labeled "$y_1$") that corresponds to the local feature vector 321 (e.g., the first local feature vector), and the encoded local feature vector 331 may be an encoded representation of the local feature vector 321.

According to certain example embodiments, the second set 330 of vectors may each have a same number of dimensions, which may be distinct from the first number of dimensions for the first set 320 of vectors, and which may be called a second number of dimensions. For example, the second set 330 of vectors may each have six dimensions as a result of the encoding process being applied to each local feature vector of the first set 320 of vectors for the image 310.

Figure 4:
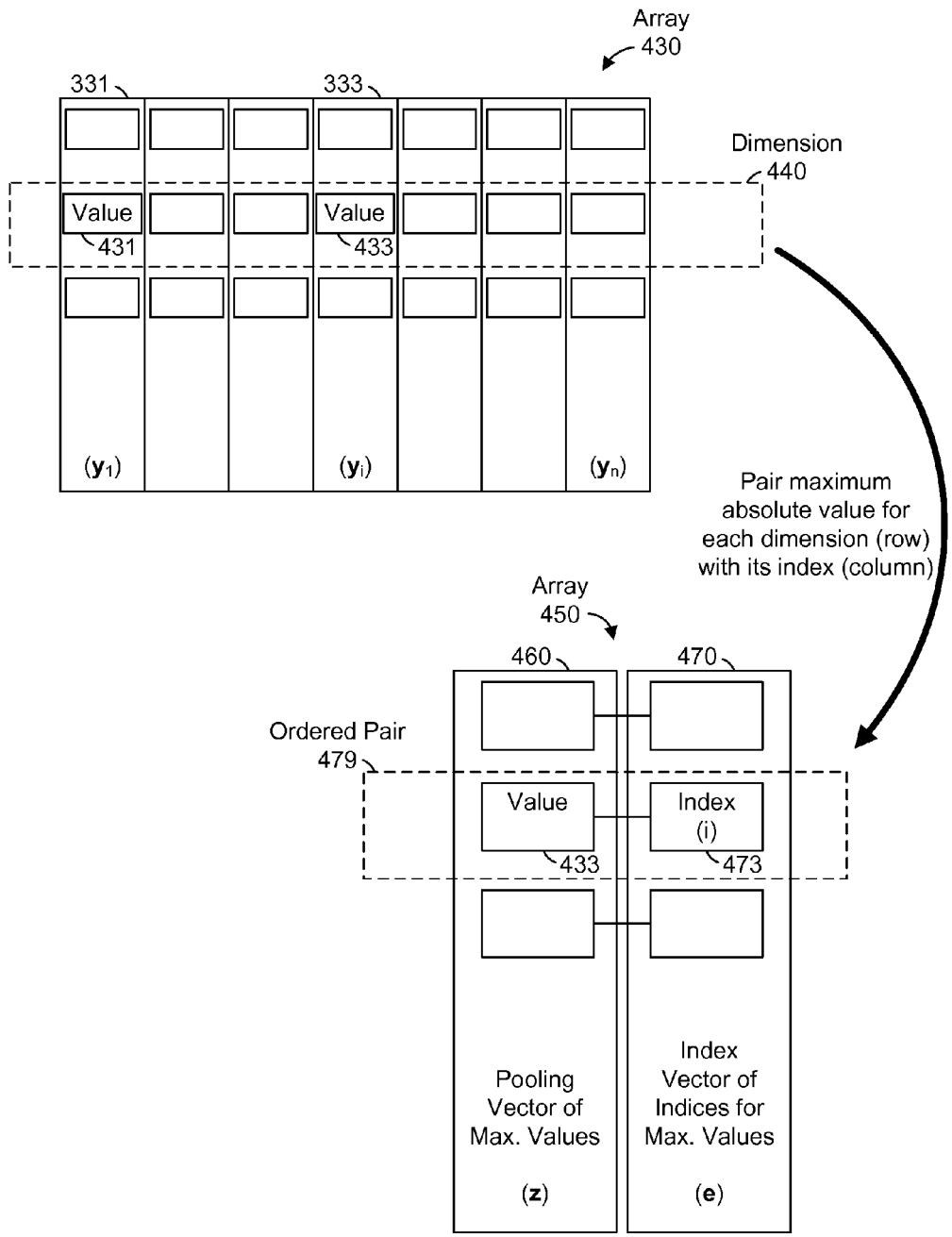
FIG. 4 is a conceptual diagram that illustrates generation of a first array of ordered pairs for the image, according to some example embodiments.

FIG. 4 is a conceptual diagram that illustrates generation of a first array 450 of ordered pairs (e.g., ordered pair 479) for the image 310, according to some example embodiments. This generation of the first array 450 may be performed by the feature vector module 220 of the recognition machine 110. As shown, the second set 330 of encoded local feature vectors (e.g., encoded local feature vectors 331 and 333, as discussed above with respect to FIG. 3) may be arranged as an array 430 of encoded local feature vectors (e.g., encoded local feature vectors 331 and 333) for the image 310.

As noted above, each of the encoded local feature vectors (e.g., encoded local feature vectors 331 and 333) in the second set 330 of vectors may have the same number (e.g., second number) of dimensions. Thus, in the array 430, the feature vector module 220 may compare values (e.g., values 431 and 433) of a particular dimension 440 for each of these encoded local feature vectors. This concept is illustrated in FIG. 4 by depicting the encoded feature vectors side-by-side in the array 430, so that the dimension 440 is represented by a row within the array 430, while each encoded local feature vector is represented by a column within the array 430. Hence, the value 431 of the dimension 440 in the encoded local feature vector 331 may be compared to the value 433 of the same dimension 440 in the encoded local feature vector 333.

By comparing values (e.g., comparing value 431 to value 433), the feature vector module 220 may identify a value for the dimension 440 that significantly characterizes the image 310. For example, the feature vector module 220 may compare all values for the dimension 440 and determine that the value 433 has a maximum absolute value (e.g., is a maximum value or a minimum value) among all other values (e.g., value 431) for the dimension 440 within the array 430 of encoded local feature vectors. This process may be performed for each dimension (e.g., dimension 440) represented in the second set 330 of encoded local feature vectors (e.g., encoded local feature vectors 331 and 333). Accordingly, the feature vector module 220 may identify, determine, or otherwise obtain a characteristic value (e.g., a maximum absolute value or a maximum value) for each dimension of the encoded local feature vectors.

As shown in FIG. 4, these characteristic values may be paired (e.g., by the feature vector module 220) with indices that indicate which encoded local feature vector corresponds to which characteristic value. In other words, each characteristic value may be paired with the index of its corresponding encoded local feature vector, which is also the index of its corresponding pixel block within the image 310. This may be accomplished by generating a pooling vector 460 (e.g., a pooling vector of maximum values, labeled "z") and an index vector 470 (e.g., an index vector of indices for maximum values, labeled "e"), and then generating the first array 450 of ordered pairs (e.g., ordered pair 479), where the ordered pairs map each characteristic value (e.g., value 433) with its corresponding index (e.g., index 473).

In the example shown in FIG. 4, the characteristic values are maximum values. Accordingly, the pooling vector 460 is a vector of maximum values for the dimensions (e.g., dimension 440) that are represented in the second set 330 of encoded local feature vectors, and the index vector 470 is a vector of indices for these maximum values. As an example, the value 433 may be the maximum value for the dimension 440, and the value 433 corresponds to (e.g., comes from) the encoded local feature vector 333, which may be the i-th encoded local feature vector in the second set 330 of encoded local feature vectors (e.g., corresponding to the i-th pixel block 313 of the image 310). Therefore, the feature vector module 220 may pair the value 433 with the index 473 (e.g., labeled "i") to generate the ordered pair 479.

By generating an ordered pair for each dimension (e.g., dimension 440) of the array 430 of encoded local feature vectors, the feature vector module 220 may generate the first array 450 of ordered pairs. In some example embodiments, the feature vector module 220 generates the first array 450 of ordered pairs by mapping the pooling vector 460 to the index vector 470, and storing the result as the first array 450 of ordered pairs.

Figure 5:
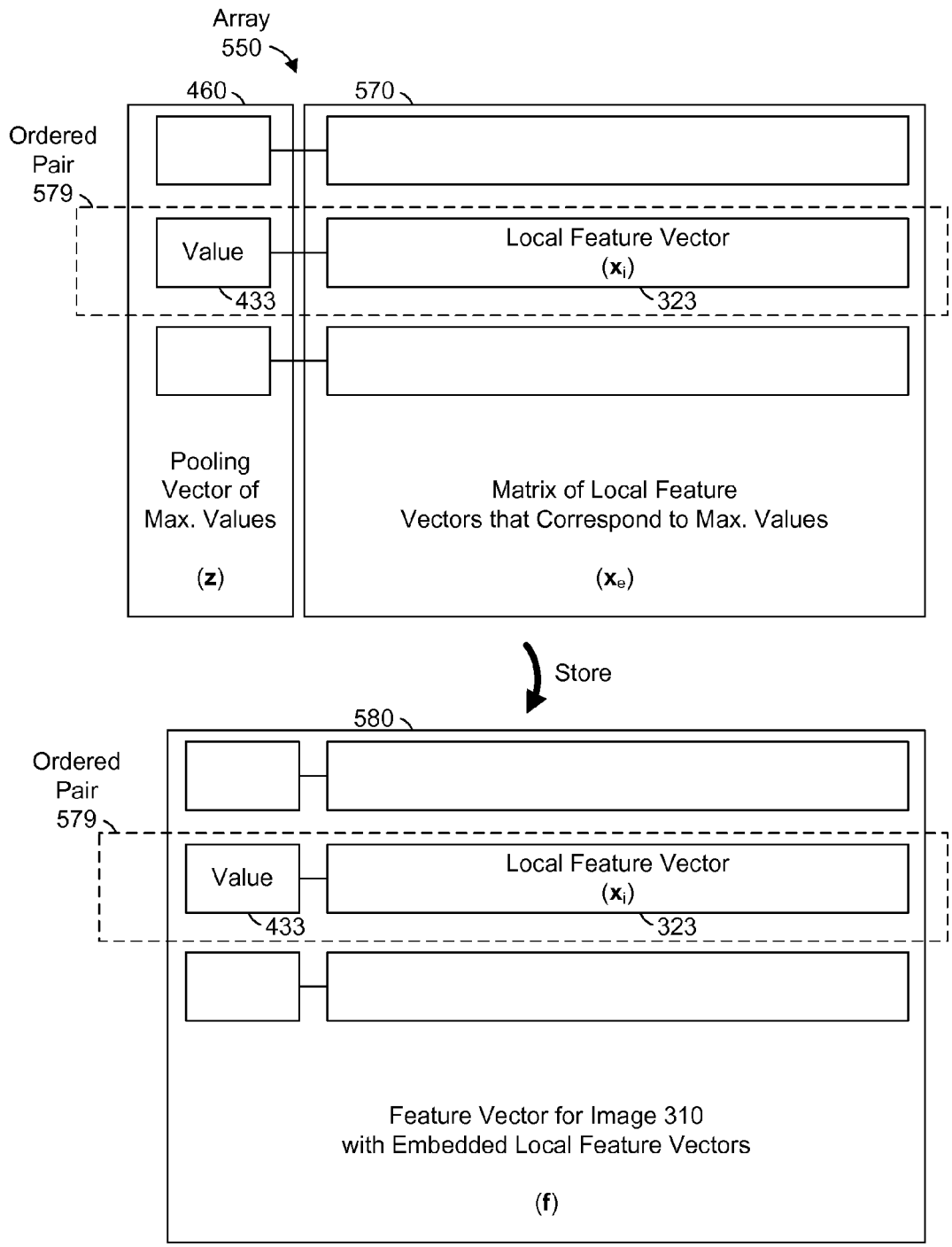
FIG. 5 is a conceptual diagram that illustrates generation of a second array of ordered pairs for the image, according to some example embodiments.

FIG. 5 is a conceptual diagram that illustrates generation of a second array 550 of ordered pairs (e.g., ordered pair 579) for the image 310, according to some example embodiments. This generation of the second array 550 may be performed by the feature vector module 220 of the recognition machine 110. As shown, the values (e.g., value 433) of the pooling vector 460 (e.g., a vector of maximum values, as discussed above with respect to FIG. 4) may be paired with their corresponding local feature vectors (e.g., local feature vector 323 from the first set 320 of local feature vectors, as discussed above with respect to FIG. 3). In FIG. 5, this is shown by arranging the pooling vector 460 with a matrix 570 (e.g., labeled "$x_e$") of local feature vectors that correspond to the values (e.g., value 433) of the pooling vector 460. As an example, the value 433 may be the characteristic (e.g., maximum) value for the dimension 440, and the value 433 corresponds to (e.g., comes from) the local feature vector 323, which may be the i-th local feature vector in the first set 320 of local feature vectors (e.g., corresponding to the i-th pixel block 313 of the image 310). Therefore, the feature vector module 220 may pair the value 433 with the local feature vector 323 (e.g., labeled "$x_i$") to generate the ordered pair 579. In certain example embodiments, the local feature vector 323 is identified based on an index (e.g., "i") of its corresponding encoded local feature vector 333.

By generating an ordered pair for each dimension (e.g., dimension 440) of the array 430 of encoded local feature vectors, the feature vector module 220 may generate the second array 550 of ordered pairs. In some example embodiments, the feature vector module 220 generates the second array 550 of ordered pairs by starting with the first array 450 of ordered pairs and replacing the index vector 470 with the matrix 570 of local feature vectors.

As shown in FIG. 5, the resulting second array 550 of ordered pairs may be stored as a feature vector 580 (e.g., labeled "f") that corresponds to the image 310 in its entirety. For example, after generating the second array 550 of ordered pairs, the vector storage module 230 may store the second array 550 in the database 115 as the feature vector 580 for the image 310. Similar to the second array 550 of ordered pairs, the feature vector 580 maps the values (e.g., value 433) from the pooling vector 460 to their corresponding local feature vectors (e.g., local feature vector 323). This may have the effect of building a single vector of characteristic values (e.g., value 433) for each dimension (e.g., dimension 440) represented in the second set 330 of encoded local feature vectors, where these characteristic values are paired with their respective original (e.g., unencoded) local feature vectors (e.g., local feature vector 323). Thus, the feature vector 580 for the image 310 may provide a subset of its original local feature vectors (e.g., a subset of the first set 320 of local feature vectors) along with corresponding characteristic values (e.g., maximum values) from their encoded counterparts (e.g., in the second set 330 of encoded local feature vectors). Hence, the feature vector 580 may be described as including (e.g., embedding) the most significant local feature vectors of the image 310 (e.g., most significant for the purpose of recognizing of coarse-grained and fine-grained visual patterns).

Figure 6:
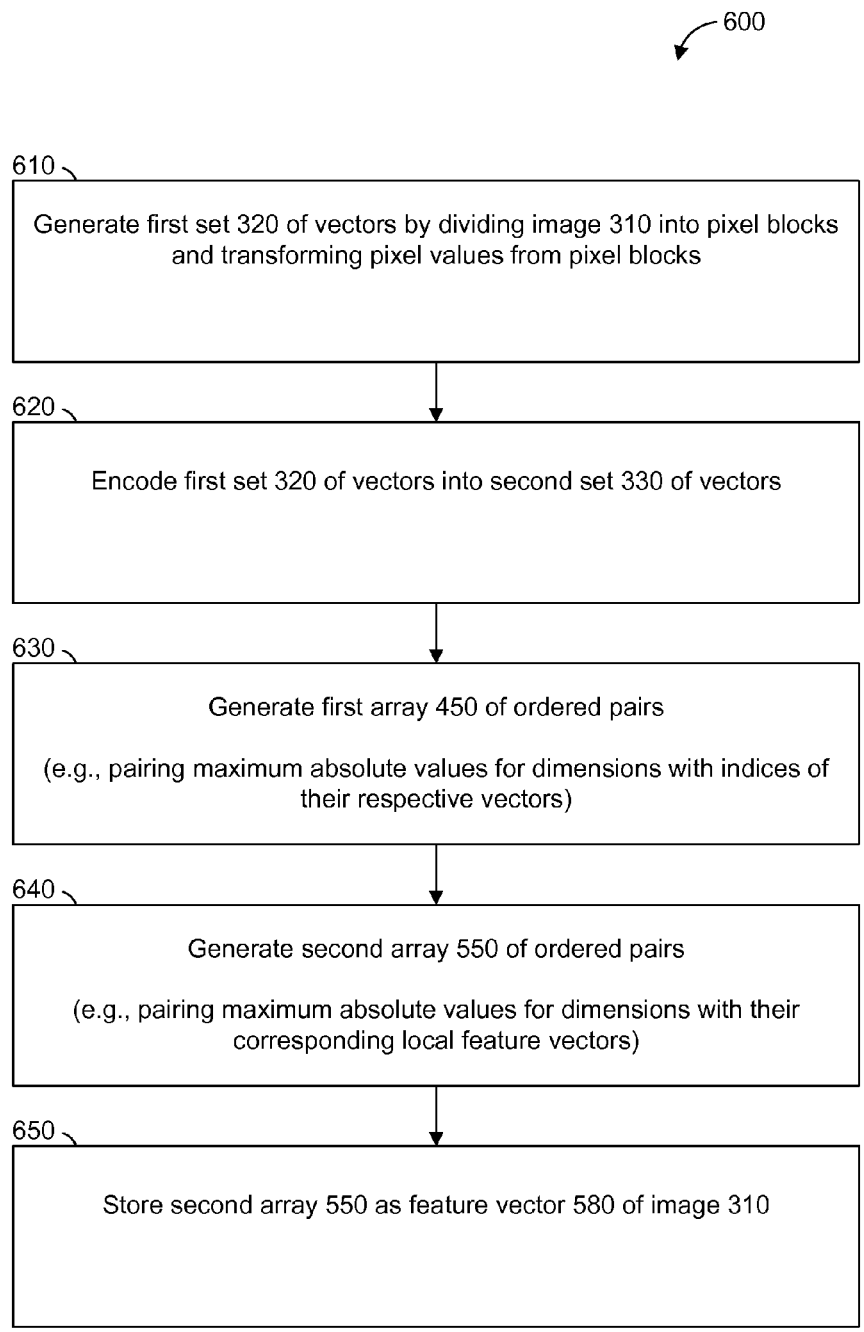
FIG. 6-8 are flowcharts illustrating operations of the recognition machine in performing a method of processing the image, according to some example embodiments.
Figure 7:
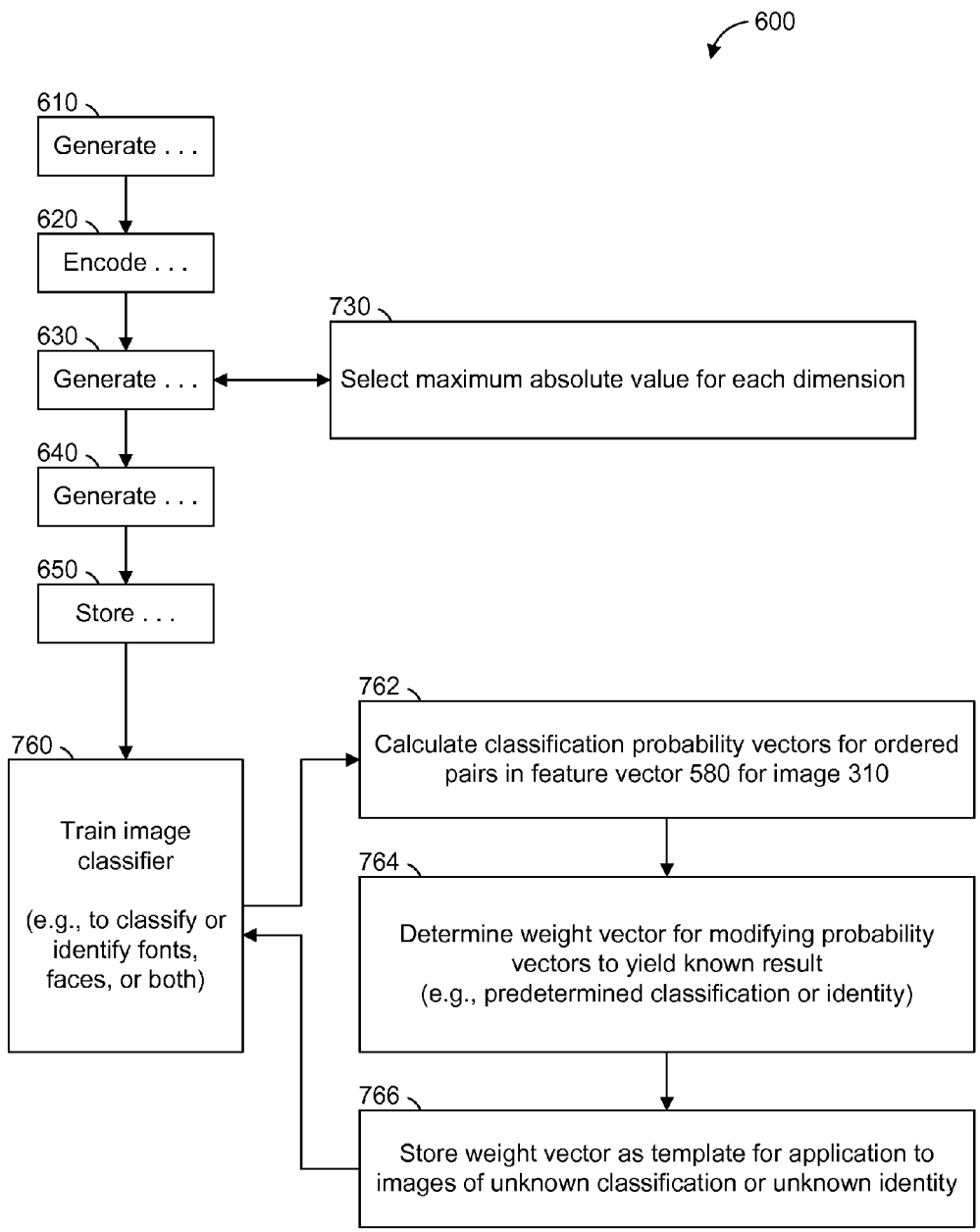
Figure 8:
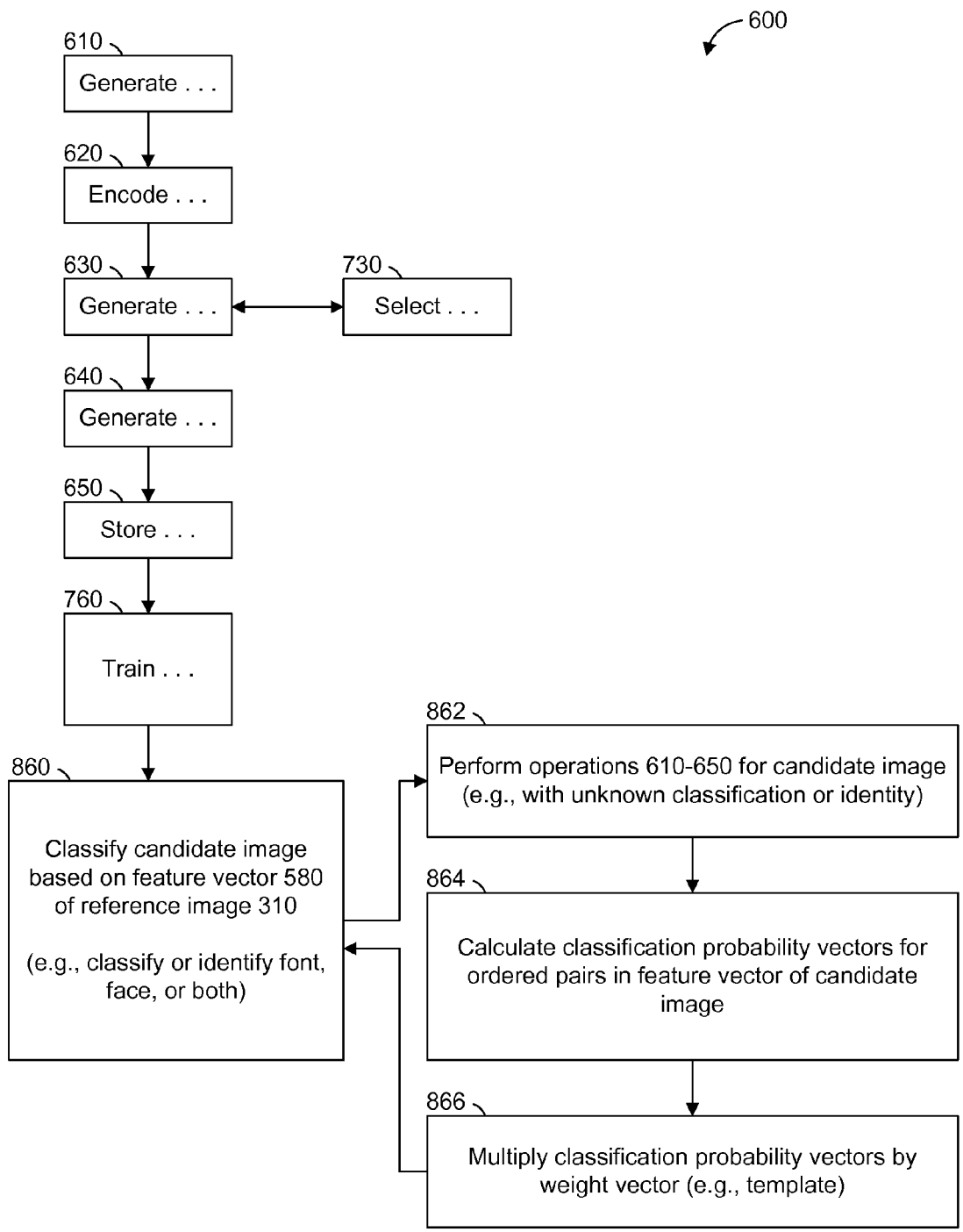

FIG. 6-8 are flowcharts illustrating operations of the recognition machine 110 in performing a method 600 of processing the image 310, according to some example embodiments. Operations in the method 600 may be performed using modules described above with respect to FIG. 2. As shown in FIG. 6, the method 600 includes operations 610, 620, 630, 640, and 650.

Prior to operation 610, the image access module 210 of the recognition machine 110 may access the image 310 from the database 115. As a preprocessing operation, the feature vector module 220 may determine the pixel blocks (e.g., pixel blocks 311-315), for example, by dividing the image 310 into overlapping or non-overlapping pixel blocks. In some example embodiments, this preprocessing operation is included as part (e.g., a precursor task, a subroutine, or a portion) of operation 610.

In operation 610, the feature vector module 220 of the recognition machine 110 generates the first set 320 of local feature vectors (e.g., local feature vectors 321 and 323). An example is discussed above with respect to FIG. 3. As noted above, this may be performed by executing a mathematical transformation on each of the pixel blocks (e.g., pixel blocks 311-350) of the image 310. For example, the mathematical transformation may generate the local feature vector 321 from pixel values of the pixel block 311, and a mathematical transformation may generate the local feature vector 323 from pixel values of the pixel block 313.

In operation 620, the feature vector module 220 encodes the first set 320 of local feature vectors into a second set 330 of encoded local feature vectors. An example is discussed above with respect to FIG. 3. In some example embodiments, this encoding operation reduces the number of dimensions represented from a first number of dimensions to a second number of dimensions that is less than the first number of dimensions. Accordingly, the ordered pairs in the first array 450 of ordered pairs may be equal in number to the second number of dimensions, and the ordered pairs in the second array 550 of ordered pairs may likewise be equal in number to the second number of dimensions.

In operation 630, the feature vector module 220 generates the first array 450 of ordered pairs (e.g., ordered pair 479). An example is discussed above with respect to FIG. 4. As noted above, the value 433 may be determined to be a characteristic value (e.g., maximum absolute value or maximum value) for the dimension 440. Hence, the ordered pair 479 (e.g., a first ordered pair) may pair the value 433 from the encoded local feature vector 333 with an index of that encoded local feature vector 333, and this index may indicate the pixel block 313 that corresponds to that same encoded local feature vector 333.

In operation 640, the feature vector module 220 generates the second array 550 of ordered pairs (e.g., ordered pair 579). An example is discussed above with respect to FIG. 5. As noted above, the ordered pair 579 (e.g., a second ordered pair) may pair the value 433 from the encoded local feature vector 333 with the local feature vector 323 itself (e.g., the corresponding local feature vector for the value 433). According to certain example embodiments, operation 640 may include identifying the local feature vector 323 (e.g., a first vector) based on an index (e.g., "i") of its corresponding encoded local feature vector 333 (e.g., a second vector).

In operation 650, the vector storage module 230 of the recognition machine 110 stores the second array 550 of ordered pairs as the feature vector 580 of the image 310. An example is discussed above with respect to FIG. 5. The feature vector 580 may be used as a representative of the significant features depicted in the image 310 in any algorithm for visual pattern recognition. As noted above, the feature vector 580 may be stored in the database 115. In some example embodiments, the feature vector 580 is later accessed (e.g., by the image access module 210) for use by the classifier trainer module 250 as a basis for training the image classifier module 240.

As shown in FIG. 7, the method 600 may include one or more of operations 730 and 760. According to some example embodiments, operation 730 may be performed as part (e.g., a precursor task, a subroutine, or a portion) of operation 630, in which the feature vector module 220 generates the first array 450 of ordered pairs. In operation 730, the feature vector module 220 determines the characteristic value for the dimension 440 by selecting the maximum absolute value for the dimension 440 (e.g., a dimension in common) among the encoded local feature vectors (e.g., encoded local feature vector 333) in the array 430 of encoded local feature vectors. Thus, the value 433 may be selected as the characteristic value for the dimension 440.

According to certain example embodiments, the image 310 may be a test image or a training image whose classification, categorization, or identity is already known (e.g., predetermined). Thus, the feature vector 580 of the image 310 may be used to train an image classifier (e.g., image classifier module 240). This training may be performed by the classifier trainer module 250 of the recognition machine 110.

Operation 760 may be performed after operation 650, in which the vector storage module 230 stores the feature vector 580 of the image 310. In operation 760, the classifier trainer module 250 of the recognition machine 110 trains the image classifier module 240 (e.g., an image classifier, image categorization module, visual pattern recognizer, or any suitable combination thereof). For example, the image classifier module 240 may be trained to classify, categorize, or identify fonts, objects, faces of persons, scenes, or any suitable combination thereof, depicted within the image 310. Moreover, the image classifier module 240 may be trained to classify the image 310 based on the second array 550 of ordered pairs (e.g., stored in the database 115 as the feature vector 580 of the image 310).

For example, the image 310 may depict some text rendered in a font (e.g., Times New Roman, bold and italic). In such a situation, performance of operation 760 may train the image classifier module 240 to classify the image 310 by classifying the font in which the text depicted in the image 310 is rendered. Furthermore, the classifying of this font may be based on the second array 550 of ordered pairs (e.g., stored in the database 115 as the feature vector 580 of the image 310), which may be used to characterize the visual pattern of the font.

As another example, the image 310 may depict a face of a person (e.g., a famous celebrity or a wanted criminal). In such a situation, performance of operation 760 may train the image classifier module 240 to classify the image 310 by classifying the face depicted in the image 310 (e.g., by classifying a facial expression exhibited by the face, classifying a gender of the face, classifying an age of the face, or any suitable combination thereof). Furthermore, the classifying of this face may be based on the second array 550 of ordered pairs (e.g., stored in the database 115 as the feature vector 580 of the image 310), which may be used to characterize the face as a visual pattern or characterize a visual pattern within the face (e.g., a visual pattern that includes a scar, a tattoo, makeup, or any suitable combination thereof).

According to various example embodiments, one or more of operations 762, 764, and 766 may be performed as part (e.g., a precursor task, a subroutine, or a portion) of operation 760. In operation 762, the classifier trainer module 250 calculates classification probability vectors for the second array 550 of ordered pairs. For example, for the ordered pair 579 (e.g., the second ordered pair), a classification probability vector may be calculated, and this classification probability vector may define a distribution of probabilities that the local feature vector 323 (e.g., as a member of the ordered pair 579) represents features that characterize various classes (e.g., categories) of images. As such, the distribution of probabilities includes a probability of the local feature vector 323 (e.g., the first vector) representing a feature that characterizes a particular class of images (e.g., a particular style of font, such as italic or bold, or a particular gender of face).

For purposes of training the image classifier module 240, it may be helpful to modify the classification probability vectors calculated in operation 762 (e.g., so that the modified classification probability vectors result in the known classification, categorization, or identity of the image 310). This may be accomplished by determining a weight vector whose values (e.g., scalar values) may be applied as weights to the distribution of probabilities defined by each classification probability vector. Accordingly, in operation 764, the classifier trainer module 250 determines such a weight vector (e.g., with the constraint that the weighted classification probability vectors produced the unknown result for the image 310, when the weight vector is multiplied to each of the classification probability vectors).

With the effect of the weight vector, the modified (e.g., weighted) classification probability vectors define a modified distribution of probabilities, and the modified distribution of probabilities include a modified probability of the local feature vector 323 (e.g., the first vector) representing a feature that characterizes the particular image class known for the image 310. Moreover, by definition, the modified distribution of probability indicates that the local feature vector 323 indeed does represent the feature that characterizes the known class of images for the image 310. In other words, supposing that the image 310 is known to belong to a particular class of images, the weight vector may be determined based on a constraint that the feature represented by the local feature vector 323 characterizes this class of images to which the image 310 belongs.

Once determined, the weight vector may be stored as a template. For example, the template may be stored in the database 115, and the template may be subsequently applicable to multiple classes of images (e.g., multiplied to classification probability vectors that are calculated for inside or outside the known classification for the image 310). For example, the template may be applicable to images (e.g., candidate images) of unknown classification (e.g., unknown category) or unknown identity. Accordingly, in operation 766, the classifier trainer module 250 may store the weight vector as such a template in the database 115.

As shown in FIG. 8, the method 600 may include one or more of operations 730, 760, and 860. Operation 730 and 760 are described above with respect to FIG. 7, and operation 860 may be performed at a point in time after performance of operation 760 (e.g., seconds, minutes, days, months, or years).

According to certain example embodiments, the image 310 may be a reference image (e.g., a test image or a training image whose classification, categorization, or identity is already known). Supposing that the image classifier module 240 of the recognition machine 110 has been trained (e.g., by the classifier trainer module 250) based on the image 310 (e.g., along with other reference images), the image classifier module 240 may be used to classify one or more candidate images of unknown classification, categorization, or identity. For example, the user 132 may use his device 130 to submit a candidate image (e.g., that depicts a visual pattern similar to that found in the image 310) to the recognition machine 110 for visual pattern recognition (e.g., image classification, image categorization, or image identification). As discussed above with respect to FIG. 7, the training of the image classifier module 240 may be performed by the classifier trainer module 250 in operation 760.

In operation 860, image classifier module 240 classifies a candidate image (e.g., a further image, perhaps similar to the image 310). For example, the image classifier module 240 may classify, categorize, or identify fonts, objects, faces of persons, scenes, or any suitable combination thereof, depicted within the candidate image. As noted above, the image classifier module 240 may be trained with the second array 550 of ordered pairs (e.g., stored in the database 115 as the feature vector 580 of the image 310). Moreover, the image classifier module 240 may classify the candidate image based on a feature vector of the candidate image (e.g., a counterpart to the feature vector 580 of the image 310, generated in a manner similar to second array 550 of ordered pairs).

For example, the candidate image may depict some text rendered in a font (e.g., Times New Roman, bold and italic). In such a situation, performance of operation 860 may classify the candidate image by classifying the font in which the text depicted in the candidate image is rendered. Furthermore, the classifying of this font may be based on the feature vector of the candidate image (e.g., the candidate image's version of the feature vector 580 for the image 310, generated in a manner similar to second array 550 of ordered pairs), which may be used to characterize the visual pattern of the font.

As another example, the candidate image may depict a face of a person (e.g., a famous celebrity or a wanted criminal). In such a situation, performance of operation 860 may classify the candidate image by classifying the face depicted in the candidate image (e.g., by classifying a facial expression exhibited by the face, classifying a gender of the face, classifying an age of the face, or any suitable combination thereof). Furthermore, the classifying of this face may be based on the feature vector of the candidate image (e.g., the candidate image's counterpart to the feature vector 580 of the image 310, generated in a manner similar to second array 550 of ordered pairs), which may be used to characterize the face as a visual pattern or characterize a visual pattern within the face (e.g., a visual pattern that includes a scar, a tattoo, makeup, or any suitable combination thereof).

According to various example embodiments, one or more of operations 862, 864, and 866 may be performed as part (e.g., a precursor task, a subroutine, or a portion) of operation 860. In operation 862, the image classifier module 240 initiates performance of operations 610-650 for the candidate image (e.g., instead of the image 310). Thus, the recognition machine 110 may generate a feature vector for the candidate image and store this feature vector in the database 115.

In operation 864, the image classifier module 240 calculates classification probability vectors for the feature vector of the candidate image. This may be performed in a manner similar to that described above with respect to FIG. 7 for operation 762. For example, for each ordered pair in the feature vector of the candidate image, a classification probability vector may be calculated to define a distribution of probabilities that the corresponding local feature vector (e.g., as a member of the ordered pair) represents features that characterize various classes (e.g., categories) of images. As such, the distribution of probabilities includes a probability of the local feature vector 323 (e.g., the first vector) representing a feature that characterizes a particular class of images (e.g., a particular style of font, such as italic or bold, or a particular gender of face).

In operation 866, the weight vector (e.g., templates) determined in operation 764 (e.g., as discussed above with respect to FIG. 7) is applied by the image classifier module 240 to the classification probability vectors that were calculated in operation 864 for the feature vector of the candidate image. For example, the image classifier module 240 may access the weight vector from the database 115 and multiply the classification probability vectors by the weight vector. With the effect of the weight vector, the modified (e.g., weighted) classification probability vectors for the candidate image define a modified distribution of probabilities that include a modified probability of a local feature vector of the candidate image representing a feature that characterizes a particular image class. As a result, the image classifier module 240 may cause (e.g., utilize, initiate, or execute) the trained image classifier module 240 to probabilistically determine a classification, categorization, or identity of the candidate image.

According to various example embodiments, one or more of the methodologies described herein may facilitate visual pattern recognition in an image. Moreover, one or more of the methodologies described herein may facilitate classification, categorization, or identification of a visual pattern depicted within an image, such as a font used for rendering text or a face that appears in the image. Hence, one or more the methodologies described herein may facilitate font recognition, facial recognition, facial analysis, or any suitable combination thereof.

When these effects are considered in aggregate, one or more of the methodologies described herein may obviate a need for certain efforts or resources that otherwise would be involved in recognition of visual patterns in images. Efforts expended by a user in recognizing a visual pattern that appears within an image may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 9:
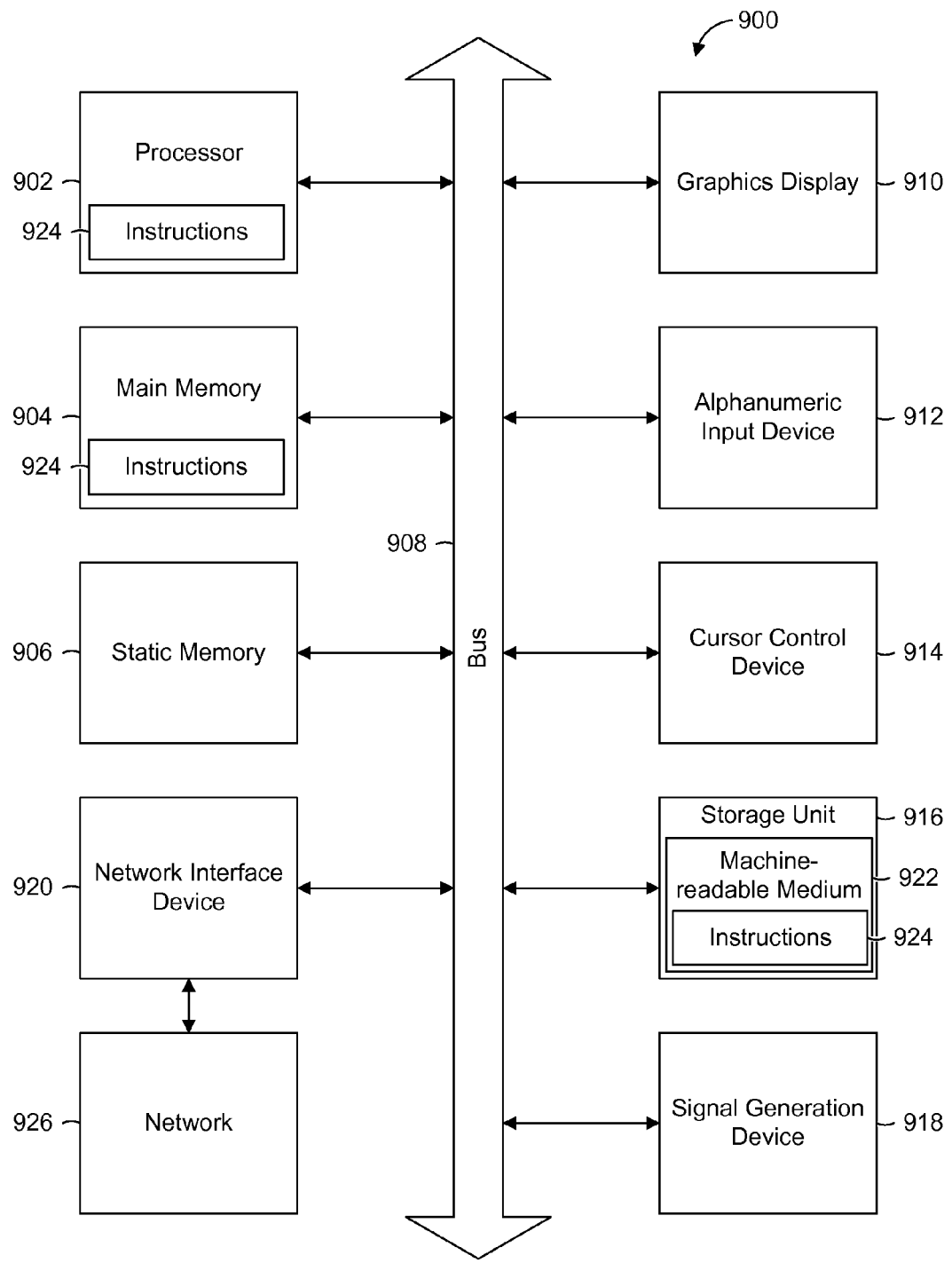
FIG. 9 is a block diagram illustrating components of a machine, according to some example embodiments, able to read instructions from a machine-readable medium and perform any one or more of the methodologies discussed herein.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system and within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a speaker), and a network interface device 920.

The storage unit 916 includes a machine-readable medium 922 (e.g., a tangible and non-transitory machine-readable storage medium) on which are stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media (e.g., tangible and non-transitory machine-readable media). The instructions 924 may be transmitted or received over a network 926 (e.g., network 190) via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., machine 900), such that the instructions, when executed by one or more processors of the machine (e.g., processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
generating a first set of vectors by dividing an image into pixel blocks and transforming pixel values from the pixel blocks, a first vector of the first set being generated from a pixel block among the pixel blocks;
encoding the first set of vectors into a second set of vectors, a second vector of the second set being an encoded representation of the first vector;
generating a first array of ordered pairs, a first ordered pair of the first array pairing a value from the second vector with an index of the second vector, the index indicating the pixel block;
using a processor, generating a second array of ordered pairs, a second ordered pair of the second array pairing the value with the first vector; and
storing the second array as a feature vector of the image.

2. The method of claim 1, wherein:
the generating of the second array of ordered pairs is based on the first array of ordered pairs and includes identifying the first vector based on the index of the second vector.

3. The method of claim 1, wherein:
the value from the second vector has a maximum absolute value among the second set of vectors for a dimension in common among the second set of vectors; and
the generating of the first array includes selecting the value based on the value having the maximum absolute value for the dimension.

4. The method of claim 1 further comprising:
training an image classifier to classify the image based on the second array of ordered pairs stored as the feature vector of the image.

5. The method of claim 4, wherein:
the image depicts text rendered in a font; and
the training of the image classifier trains the image classifier to classify the image by classifying the font in which the text depicted in the image is rendered.

6. The method of claim 5, wherein:
the classifying of the image includes identifying the font based on the second array or ordered pairs stored as the feature vector of the image.

7. The method of claim 4, wherein:
the image depicts a face of a person; and
the training of the image classifier trains the image classifier to classify the image by classifying the face depicted in the image.

8. The method of claim 4, wherein:
the training of the image classifier includes calculating a probability vector for the second ordered pair, the probability vector defining a distribution of probabilities that include a probability of the first vector representing a feature that characterizes a class of images.

9. The method of claim 8, wherein:
the training of the image classifier includes determining a weight vector of scalar values that, when the weight vector is multiplied to the probability vector, modify the distribution of probabilities to indicate that the first vector does represent the feature that characterizes the class of images.

10. The method of claim 9, wherein:
the image belongs to the class of images; and
the training of the image classifier determines the weight vector based on a constraint that the feature represented by the first vector characterizes the class of images to which the image belongs.

11. The method of claim 9, wherein:
the training of the image classifier includes storing the weight vector as a template applicable to multiple classes of images.

12. The method of claim 1, wherein:
the image is a reference image; and the method further comprises classifying a candidate image based on the second array of ordered pairs stored as the feature vector of the reference image.

13. The method of claim 12, wherein:
the candidate image depicts text rendered in a font; and
the classifying of the candidate image includes classifying the font in which the text depicted in the candidate image is rendered.

14. The method of claim 13, wherein:
the classifying of the candidate image includes identifying the font using an image classifier trained with the second array of ordered pairs stored as the feature vector of the reference image, the identifying of the font being based on a further feature vector of the candidate image.

15. The method of claim 12, wherein:
the reference image belongs to a class of images; and
the classifying of the candidate image is based on a weight vector determined based on a constraint that a feature represented by the first vector characterizes the class of images to which the reference image belongs.

16. The method of claim 1, wherein:
the first vector has a first number of dimensions;
the second vector has a second number of dimensions that is less than the first number of dimensions; the ordered pairs in the first array are equal in number to the second number of dimensions; and the ordered pairs in the second array are equal in number to the second number of dimensions.

17. A non-transitory machine-readable storage medium comprising instructions that, when executed by one or more processors of a machine, cause the machine to perform operations comprising:
- generating a first set of vectors by dividing an image into pixel blocks and mathematically transforming pixel values from the pixel blocks, a first vector of the first set being generated from a pixel block among the pixel blocks;
- encoding the first set of vectors into a second set of vectors, a second vector of the second set being an encoded representation of the first vector;
- generating a first array of ordered pairs, a first ordered pair of the first array pairing a value from the second vector with an index of the second vector, the index indicating the pixel block from which the first vector is generated;
- generating a second array of ordered pairs, a second ordered pair of the second array pairing the value from the second vector with the first vector generated from the pixel block; and
- storing the second array of ordered pairs as a feature vector of the image.

18. The non-transitory machine-readable storage medium of claim 17, wherein: the image is a reference image; and the operations further comprise classifying a candidate image based on the second array of ordered pairs stored as the feature vector of the reference image.

19. A system comprising:
a processor configured by a feature vector module to:
- generate a first set of vectors by dividing an image into pixel blocks and transforming pixel values from the pixel blocks, a first vector of the first set being generated from a pixel block among the pixel blocks;
- encode the first set of vectors into a second set of vectors, a second vector of the second set being an encoded representation of the first vector;
- generate a first array of ordered pairs, a first ordered pair of the first array pairing a value from the second vector with an index of the second vector, the index indicating the pixel block; and
- generate a second array of ordered pairs, a second ordered pair of the second array pairing the value with the first vector; and a vector storage module configured to store the second array as a feature vector of the image.

20. The system of claim 19 further comprising:
a classifier trainer module configured to train an image classifier to classify the image based on the second array of ordered pairs stored as the feature vector of the image.

* * * * *